(12) United States Patent
Nagai (10) Patent No.: US 10,406,769 B2
(45) Date of Patent: *Sep. 10, 2019

(54) METHOD OF MANUFACTURING PNEUMATIC TIRE, SHAPING DEVICE AND PNEUMATIC TIRE

(71) Applicant: TOYO TIRE & RUBBER CO., LTD., Osaka-shi, Osaka (JP)

(72) Inventor: Kunihiko Nagai, Osaka (JP)

(73) Assignee: TOYO TIRE CORPORATION, Itami-shi (JP)

(*) Notice: Subject to any disclaimer, the term of this patent is extended or adjusted under 35 U.S.C. 154(b) by 264 days.

This patent is subject to a terminal disclaimer.

(21) Appl. No.: 15/149,627

(22) Filed: May 9, 2016

(65) Prior Publication Data

US 2016/0332402 A1   Nov. 17, 2016

(30) Foreign Application Priority Data

May 11, 2015  (JP) .................. 2015-096719

(51) Int. Cl.
*B29D 30/36* (2006.01)
*B29D 30/30* (2006.01)
(Continued)

(52) U.S. Cl.
CPC ......... *B29D 30/36* (2013.01); *B29D 30/0601* (2013.01); *B29D 30/30* (2013.01);
(Continued)

(58) Field of Classification Search
CPC .... B29D 2030/0667; B29D 2030/2635; B29D 2030/3271; B29D 2030/545;
(Continued)

(56) References Cited

U.S. PATENT DOCUMENTS 4,051,881 A * 10/1977 Peterson ............ B29D 30/0662
                                                       156/156
RE31,273 E     6/1983 Peterson
(Continued)

FOREIGN PATENT DOCUMENTS

JP      2002046192 A  *  2/2002
JP      2012-131168 A      7/2012
(Continued)

OTHER PUBLICATIONS

Haruo Kawashima, JP-2002046192-A, machine translation. (Year: 2002).*
(Continued)

*Primary Examiner* — Robert C Dye
*Assistant Examiner* — Sedef E Paquette
(74) *Attorney, Agent, or Firm* — Westerman, Hattori, Daniels & Adrian, LLP (57) ABSTRACT

A method of manufacturing a pneumatic tire including forming a green case by cylindrically winding a tire component member which includes at least one layer of a carcass ply. A green tire is shaped by expanding the green case into a toroidal shape with the supply of a fluid into the green case so that the green case adheres to a tread ring arranged radially outside the green case. The green tire is subjected to vulcanization molding within a mold die. During the shaping of the green tire, the fluid is supplied in accordance with a pressure profile which changes in a stepwise manner. The pressure profile is set such that a former stage expansion rate in a former stage is set to slower than a final stage expansion rate in a final stage.

4 Claims, 8 Drawing Sheets

(51) Int. Cl.
  *B29D 30/06* (2006.01)
  *B29D 30/58* (2006.01)
  *B60C 9/02* (2006.01)

(52) U.S. Cl.
  CPC ............... *B29D 30/58* (2013.01); *B60C 9/02* (2013.01); *B29D 2030/0667* (2013.01); *B29D 2030/3078* (2013.01)

(58) Field of Classification Search
  CPC .......... B29D 2030/587; B29D 30/0601; B29D 30/0654; B29D 30/245; B29D 30/30; B29D 30/36; B29D 30/58; B29C 43/12; B29C 43/3642; B29C 35/02; B29K 2105/253; B60C 9/02
  USPC ....... 156/95, 105, 156, 244.14, 244.21, 285, 156/394.1, 401; 152/450
  See application file for complete search history.

(56) References Cited

U.S. PATENT DOCUMENTS

| | | | | |
|---|---|---|---|---|
| 6,234,227 | B1* | 5/2001 | Bosseaux | B29D 30/246 156/135 |
| 2004/0011450 | A1* | 1/2004 | Hanada | B29D 30/0601 152/556 |
| 2007/0194497 | A1 | 8/2007 | Fukasawa et al. | |
| 2008/0105360 | A1* | 5/2008 | Stoila | B29D 30/0645 156/135 |
| 2015/0273777 | A1* | 10/2015 | Isaka | B29D 30/1628 156/124 |

FOREIGN PATENT DOCUMENTS

| | | |
|---|---|---|
| JP | 2013-111875 A | 6/2013 |
| KR | 20040092634 A * | 11/2004 |

OTHER PUBLICATIONS

Yoen Jong Heum, KR-20040092634-A, machine translation. (Year: 2004).*

Office Action dated Jan. 12, 2018, issued in counterpart Chinese Application No. 201610293444.8, with English translation. (14 pages).

Office Action dated Jan. 2, 2018, issued in counterpart Chinese Application No. 201610291317.4, with English translation. (15 pages).

Office Action dated Aug. 24, 2018 issued in counterpart Chinese Application No. 201610291317.4, with English translation. (15 pages).

Office Action dated Sep. 25, 2018, issued in counterpart Japanese Application No. 2015-096709, with English translation. (6 pages).

Non-Final Office Action dated Jul. 9, 2018, issued in U.S. Appl. No. 15/148,476 (23 pages).

Non-Final Office Action dated Dec. 14, 2017, issued in U.S. Appl. No. 15/142,144 (34 pages).

Office Action dated May 8, 2019, issued in counterpart CN Application No. 201610291280.5, with English translation. (15 pages).

* cited by examiner

METHOD OF MANUFACTURING PNEUMATIC TIRE, SHAPING DEVICE AND PNEUMATIC TIRE

CROSS-REFERENCE TO RELATED APPLICATIONS

This application claims priority of Japanese Patent Application No.: 2015-096719 filed on May 11, 2015, the content of which is incorporated herein by reference.

BACKGROUND OF THE INVENTION

Technical Field

The present invention relates to a method of manufacturing a pneumatic tire, a shaping device and a pneumatic tire.

Related Art

Conventionally, in manufacturing a radial tire, a green case is formed by winding tire component members which include at least one layer of a carcass ply in a cylindrical shape. Next, the green case is adhered to a tread ring arranged on an outer peripheral side of the green case by expanding the green case into a toroidal shape radially outward with the supply of a fluid into the green case thus shaping a green tire. Then, the green tire is subjected to vulcanization molding within a mold die thus shaping the green tire into a product tire.

In the carcass ply, carcass cords are arranged approximately uniformly. However, there has been a case where the array of the carcass cords is disturbed at the time of shaping so that irregularities in cord openings between the carcass cords become increased. When the irregularities in cord openings between the carcass cords are increased, unevenness on a tire surface of the product tire is increased thus giving rise to a defective appearance or lowering of uniformity of the tire.

On the other hand, in a method of manufacturing a cross ply tire disclosed in JP 2012-131168 A, prior to setting of a green case into a vulcanizing mold die, pre-shaping of the green case is performed by expanding the green case with a fluid supplied to the inside of the green case, and the green case is held in an inflated state where a largest outer diameter of a tread portion becomes 60% to 90% of a largest inner diameter of a tread forming surface of the vulcanizing mold die for a predetermined time. This manufacturing method aims at the suppression of the disturbance in the array of the carcass cords and the enhancement of uniformity of the tire through the suppression by making the green tire easily be formed along a surface of a mold die and by changing a shape of the tire in a stepwise manner from the green case to a product tire through a green tire.

SUMMARY

However, in a radial tire, carcass cords are arranged orthogonal to a tire equator and hence, the green case minimally expands compared to in a cross ply tire. Accordingly, in the method disclosed in JP 2012-131168 A, the disturbance of the array of the carcass cords in the manufacture of the radial tire cannot be suppressed.

That is, in the manufacture of a radial tire, there may be a case where a green case suddenly expands depending on a shaping condition. In such a case, a green tire where irregularities in openings between carcass cords are increased is shaped. In a pneumatic tire obtained by subjecting the green tire to vulcanization molding, unevenness is liable to be generated on a tire surface due to the increase of irregularities in openings between the carcass cords. As a result, the uniformity of the tire is lowered.

The present invention has been made to enhance the uniformity of a tire by suppressing openings between carcass cords in a shaping step with respect to a radial tire.

The present invention provides a method of manufacturing a pneumatic tire including steps of forming a green case by cylindrically winding a tire component member which includes at least one layer of a carcass ply, shaping a green tire by expanding the green case into a toroidal shape with the supply of a fluid into the green case so that the green case adheres to a tread ring arranged radially outside the green case and subjecting the green tire to vulcanization molding within a mold die, wherein during the shaping of the green tire, the fluid is supplied in accordance with a pressure profile which changes in a stepwise manner, and the pressure profile is set such that a former stage expansion rate when the green case is expanded until an expansion amount of the green case becomes 35% to 40% of a full expansion amount of the green case which allows the green case to expand to an inner diameter of the tread ring from a non-expanded state is set slower than a final stage expansion rate in a final stage.

According to the present invention, until the expansion amount of the green case becomes 35% to 40% of the full expansion amount of the green case which allows the green case to expand to an inner diameter of the tread ring, the carcass ply can be easily and uniformly expanded by gently expanding the green case at the former stage expansion rate which is slower than the final stage expansion rate so that, even when a pressure of a fluid is increased in the final stage which succeeds the former stage, the carcass ply can be easily expanded while keeping uniform expanding. Accordingly, it is possible to shape the green tire where the irregularities in cord openings between the carcass cords in the carcass ply are suppressed. In this manner, in a pneumatic tire manufactured by subjecting such a green tire to vulcanization molding, unevenness on a tire surface caused by irregularities in cord openings can be suppressed and hence, uniformity of the tire can be enhanced.

It is preferable that the pressure profile is set such that an initial stage expansion rate when the green case is expanded until the expansion amount of the green case becomes 8% to 10% of the full expansion amount differs from both the former stage expansion rate and the final stage expansion rate.

With such a configuration, the degree of freedom in setting a pressure profile can be enhanced. For example, until the expansion amount of the green case becomes 8% to 10% of the full expansion amount, when an initial stage expansion rate is set slower than the former stage expansion rate, the green case can be expanded easily and more gently and hence, the irregularities in cord openings between the carcass cords in the carcass ply can be suppressed more easily.

It is preferable that the pressure profile is set such that the initial stage expansion rate is higher than both the former stage expansion rate and the final stage expansion rate.

With such a configuration, until the expansion amount of the green case becomes 8% to 10% of the full expansion amount which is an expansion amount in an initial stage, a fluid is supplied into the green case such that the green case is expanded at a relatively high expansion rate and hence, a pressure in the green case can be rapidly increased. Since expanding of the green case has not yet progressed in the initial stage, even when a pressure profile is set such that the initial stage expansion rate during this period is increased, cord openings between the carcass cords in the carcass ply are minimally influenced.

It is preferable that the pressure profile is set such that an initial stage expansion rate when the green case is expanded until the expansion amount of the green case becomes 8% to 10% of the full expansion amount is equal to the former stage expansion rate.

With such a configuration, until the expansion amount of the green case becomes 8% to 10% of the full expansion amount which is the expansion amount in the initial stage, the green case can be gently expanded and hence, the irregularities in cord openings between the carcass cords in the carcass ply can be suppressed more easily.

The present invention is further directed to a green tire shaping device including a fluid supply part which expands a green case formed by cylindrically winding a tire component member including at least one layer of a carcass ply into a toroidal shape with the supply of a fluid into the green case so that the green case adheres to a tread ring arranged radially outside the green case, wherein the fluid supply part is configured to supply the fluid in accordance with a pressure profile which changes in a stepwise manner, and the pressure profile is set such that a former stage expansion rate when the green case is expanded until an expansion amount of the green case becomes 35% to 40% of a full expansion amount of the green case which allows the green case to expand to an inner diameter of the tread ring from a non-expanded state is set slower than a final stage expansion rate which is an expansion rate in a final stage.

The present invention is still further directed to a pneumatic tire manufactured such that a green case is formed by cylindrically winding a tire component member including at least one layer of a carcass ply, the green case is expanded into a toroidal shape with the supply of a fluid into the green case so that the green case adheres to a tread ring arranged radially outside the green case thus shaping a green tire, and the green tire is subject to vulcanization molding within a mold die, wherein the fluid is supplied in accordance with a pressure profile which changes in a stepwise manner, and the pressure profile is set such that a former stage expansion rate when the green case is expanded until an expansion amount of the green case becomes 35% to 40% of a full expansion amount of the green case which allows the green case to expand to an inner diameter of the tread ring from a non-expanded state is set slower than a final stage expansion rate which is an expansion rate in a final stage.

According to the method of manufacturing a pneumatic tire, the shaping device and the pneumatic tire of the present invention, the uniformity of the tire can be enhanced by suppressing openings between the carcass cords with respect to a radial tire.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

First Embodiment

Hereinafter, an embodiment according to the present invention is described with reference to attached drawings. The description made hereinafter is provided substantially for merely exemplifying the present invention, and the description does not intend to limit the present invention, a product to which the present invention is applied or the use of the product. Further, drawings are schematic drawings, and ratios between the respective sizes may differ from actual corresponding ratios and the like.

Figure 1:
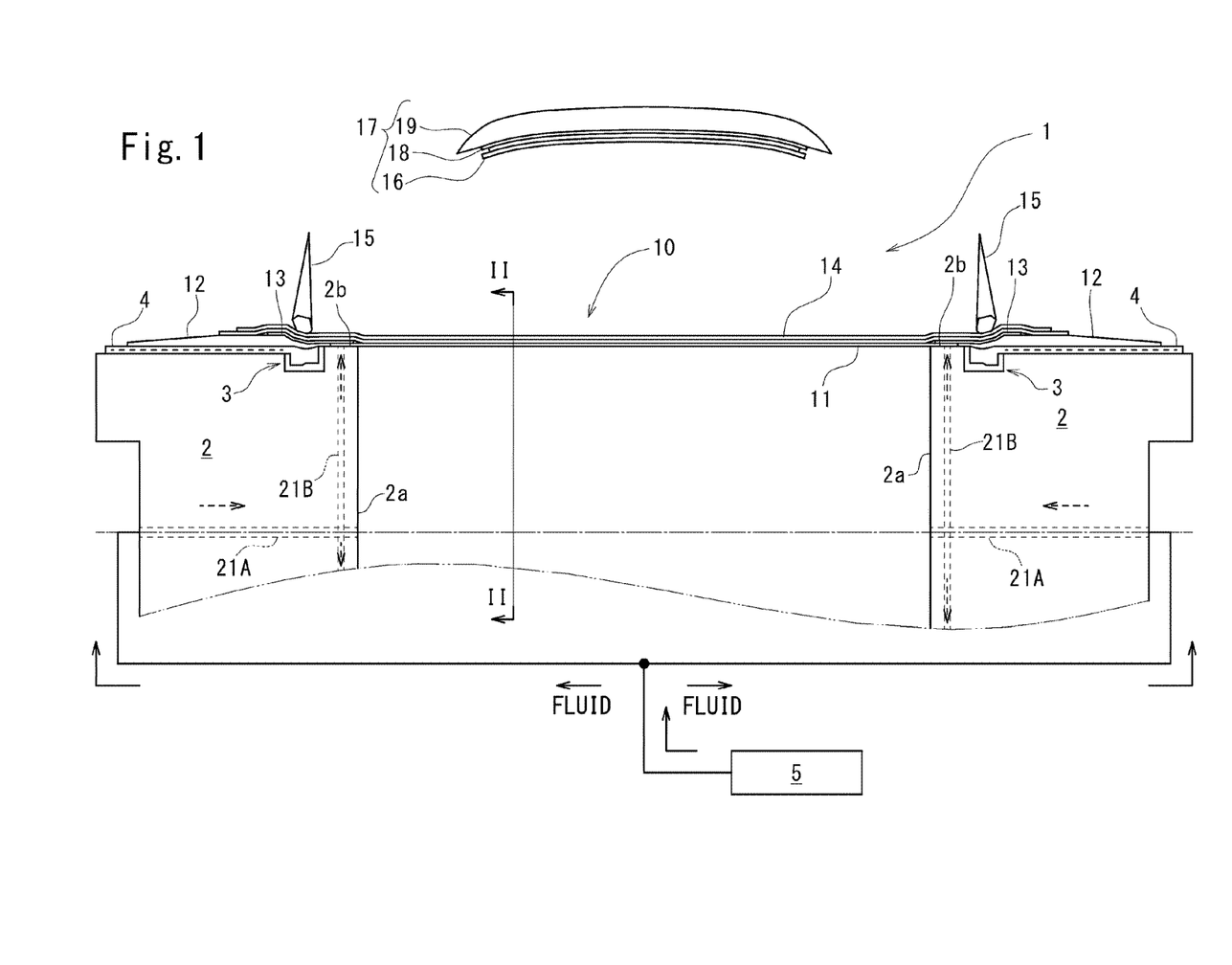
FIG. 1 is a side view showing a schematic configuration of a shaping device according to one embodiment of the present invention.

FIG. 1 shows a schematic configuration of a shaping device 1 according to one embodiment of the present invention. In FIG. 1, a cross section of a green case 10 before shaping is applied to the green case 10 and a cross section of a tread ring 17 are shown together. The shaping device 1 includes: a pair of shaping drums 2 which faces each other in an opposed manner with a predetermined distance therebetween in an axial direction, and a fluid supply part 5 connected to the shaping drums 2. In the description made hereinafter, a direction along which the shaping drums 2 approach each other is referred to as an inner side in a drum axial direction, and a direction along which the shaping drums 2 are away from each other is referred to as an outer side in the drum axial direction.

The green case 10 is a cylindrical body formed of a plurality of tire component members. That is, the green case 10 is formed by winding an inner liner 11, a pair of side wall members 12, 12 disposed on both side portions of the inner liner 11 in the axial direction, a pair of chafer layers 13, 13 each of which is arranged so as to extend between and over the inner liner 11 and the side wall member 12, a carcass ply 14 in plural layers arranged so as to extend between and over the pair of side wall members 12, 12, and annular bead members 15 disposed at predetermined positions of both side portions of the green case 10 in that order from an inner diameter side. The green case 10 is formed using a band drum (not shown) as a first forming drum.

Figure 2:
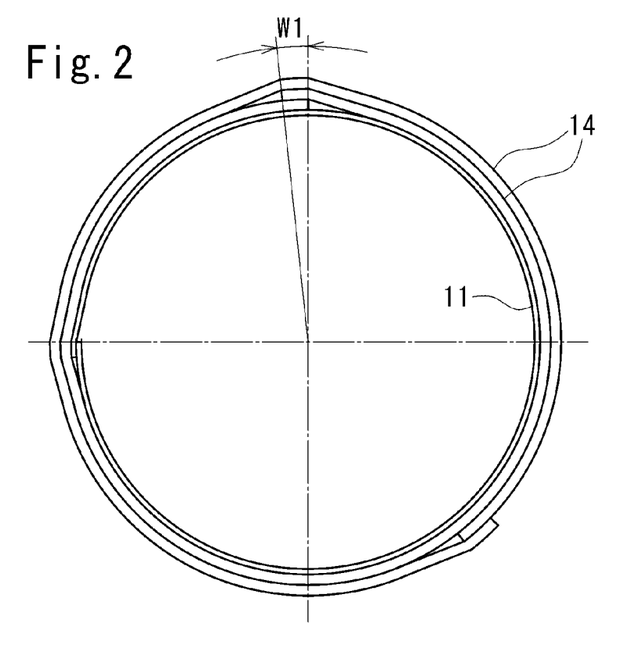
FIG. 2 is a cross-sectional view of a green case taken along a line II-II in FIG. 1.

In this embodiment, the carcass ply 14 has a two-layer structure, and carcass cords extending in the drum axial direction are arranged approximately uniformly in each layer of the carcass ply 14. As shown in FIG. 2, the carcass ply 14 is wound so as to have a joined portion where end portions of the carcass ply 14 overlap with each other with a predetermined joining width W1. It is preferable that the joining width W1 be set to 20 mm or less. The end portions of the carcass ply 14 may be joined to each other by performing butt joining where a joining width W1 is set to 0.

The smaller the joining width W1, the more overlapping in the radial direction of the carcass cords arranged in the carcass ply 14 can be decreased and hence, it is possible to suppress the rigidity of the joined portion being locally increased due to the overlapped carcass cords. With such a configuration, rigidity of the carcass ply 14 can be easily maintained approximately uniformly in the circumferential direction. Accordingly, in a shaping step, the green case 10 can be uniformly expanded so that the irregularities in openings between the carcass cords can be easily suppressed.

As shown in FIG. 1, the tread ring 17 is a cylindrical body formed by cylindrically winding a belt reinforcing layer 16, a belt layer 18 and a tread member 19 in that order from an inner diameter side. The tread ring 17 is formed using a belt drum (not shown) as a first forming drum.

The shaping drums 2 are rotationally driven about the drum axis by a drive means not shown in the drawing, and are also configured to approach each other and to move away from each other. A bead lock 3 and a turn-up bladder 4 are arranged on a peripheral portion of each shaping drum 2. The bead lock 3 is disposed on an inner side in the drum axial direction and is radially expandable and shrinkable, and the turn-up bladder 4 is adjacently disposed on an outer side of the bead lock 3 in the drum axial direction.

Each shaping drum 2 has a fluid passage 21 through which a fluid supplied from the fluid supply part 5 is supplied into the green case 10. The fluid passage 21 includes: a first fluid passage 21A communicated with an opposedly facing surface 2a of the shaping drum 2 (one of the opposedly facing surfaces 2a of the shaping drums 2); and a second fluid passage 21B communicated with an outer peripheral portion 2b disposed on an inner side of the bead lock 3 in the drum axial direction. Although the fluid passage 21 includes only one first fluid passage 21A in FIG. 1, the fluid passage 21 may include a plurality of first fluid passages 21A. A plurality of second fluid passages 21B are formed on the outer peripheral portion 2b at predetermined intervals in a circumferential direction.

In shaping a green tire using the above-mentioned shaping device 1, firstly, in a member arranging step, the green case 10 and the tread ring 17 are transferred to the shaping device 1 from the first forming drum. To be more specific, the green case 10 is arranged over the peripheral portions of the pair of shaping drums 2, 2. At the same time, a diameter of each bead lock 3 is increased outwardly in a radial direction so that each bead member 15 is supported from the inside in the radial direction whereby the green case 10 can be held while maintaining the inside of the green case 10 in an airtight state between the pair of shaping drums 2, 2. Further, the tread ring 17 is arranged radially outside the green case 10 using a holding means not shown in the drawing such that the center of the tread ring 17 and the center of the green case 10 are aligned with each other in the drum axial direction.

Next, in a shaping step, the pair of shaping drums 2, 2 is made to approach each other while supplying air into the green case 10 from the fluid supply part 5, for example. Accordingly, the green case 10 is expanded radially outwardly into a toroidal shape so that the green case 10 is joined to the tread ring 17.

Subsequently, in a turn-up step, respective turn-up bladders 4 are expanded so that both side portions of the green case 10 in the axial direction are folded back to the inside in the drum axial direction so as to wrap around the bead members 15 whereby both side portions of the green case 10 are turned up to both side portions of the expanded green case 10. Through these operations, the green tire is shaped. Then, in a vulcanizing step, the green tire is subjected to vulcanization molding within a tire vulcanizing mold die thus manufacturing a pneumatic tire.

In this embodiment, in the shaping step, the fluid supply part 5 supplies a fluid to the green case 10 through the shaping drum 2 in accordance with a pressure profile which changes in a stepwise manner. For example, the fluid supply part 5 may control a supply pressure P1 of the fluid based on an actual pressure of the fluid detected by a pressure sensor (not shown) such that the supply pressure P1 of the fluid follows a desired pressure profile. Alternatively, the fluid supply part 5 may be operated under a preset operation condition so as to realize a desired pressure profile.

Here, the supply pressure P1 of a fluid supplied to the shaping drum 2 from the fluid supply part 5 and a case internal pressure P2 in the green case 10 differ from each other during a transition period due to an internal volume of the green case 10. For example, it takes time to increase the case internal pressure P2 in the green case 10 having a predetermined internal volume. Accordingly, when the supply of the fluid to the green case 10 from the fluid supply part 5 is started, the case internal pressure P2 in the green case 10 is lower than the supply pressure P1 transitionally. On the other hand, in a state after a sufficient time elapses from the start of the supply of the fluid, the supply pressure P1 and the case internal pressure P2 in the green case 10 become substantially equal. Further, when the pair of shaping drums 2, 2 approaches each other, an internal volume of the green case 10 is decreased so that there may be a case where the case internal pressure P2 exceeds the supply pressure P1.

In this embodiment, in the shaping step, three shaping steps consisting of a pre-shaping step (initial stage), a first shaping step (former stage) and a second shaping step (final stage) are performed in that order. The fluid supply part 5 controls the supply pressure P1 of a fluid in the respective shaping steps in accordance with a pressure profile where the supply pressure P1 changes in three stages, that is, a pre-shaping pressure P11 (initial pressure), a first shaping pressure P12 (former stage pressure) and a second shaping pressure P13 (final stage pressure).

In the pre-shaping step, the shaping device 1 supplies a fluid into the green case 10 by the fluid supply part 5 at a pre-shaping pressure P11 in a state where the pair of shaping drums 2, 2 is rotated about a drum axis by a drive means not shown in the drawing and is made to approach each other at a predetermined speed. The pre-shaping pressure P11 is set to a pressure necessary for expanding the green case 10 in a non-expanded state at an expansion rate V1 until an expansion amount of the green case 10 becomes an expansion amount L1 which is approximately 10% of a full expansion amount L0 which allows the green case 10 in a non-expanded state to expand until the green case 10 is joined to the tread ring 17.

Here, "expansion rate" means an expansion amount (%) of the green case 10 per unit time assuming the full expansion amount L0 of the green case 10 as 100%. The expansion rate V1 (initial stage expansion rate) is set to a rate which falls within a range from 1 to 13 (%/sec). In this embodiment, the pre-shaping pressure P11 is set such that the expansion rate V1 becomes 10 (%/sec), for example.

Figure 3:
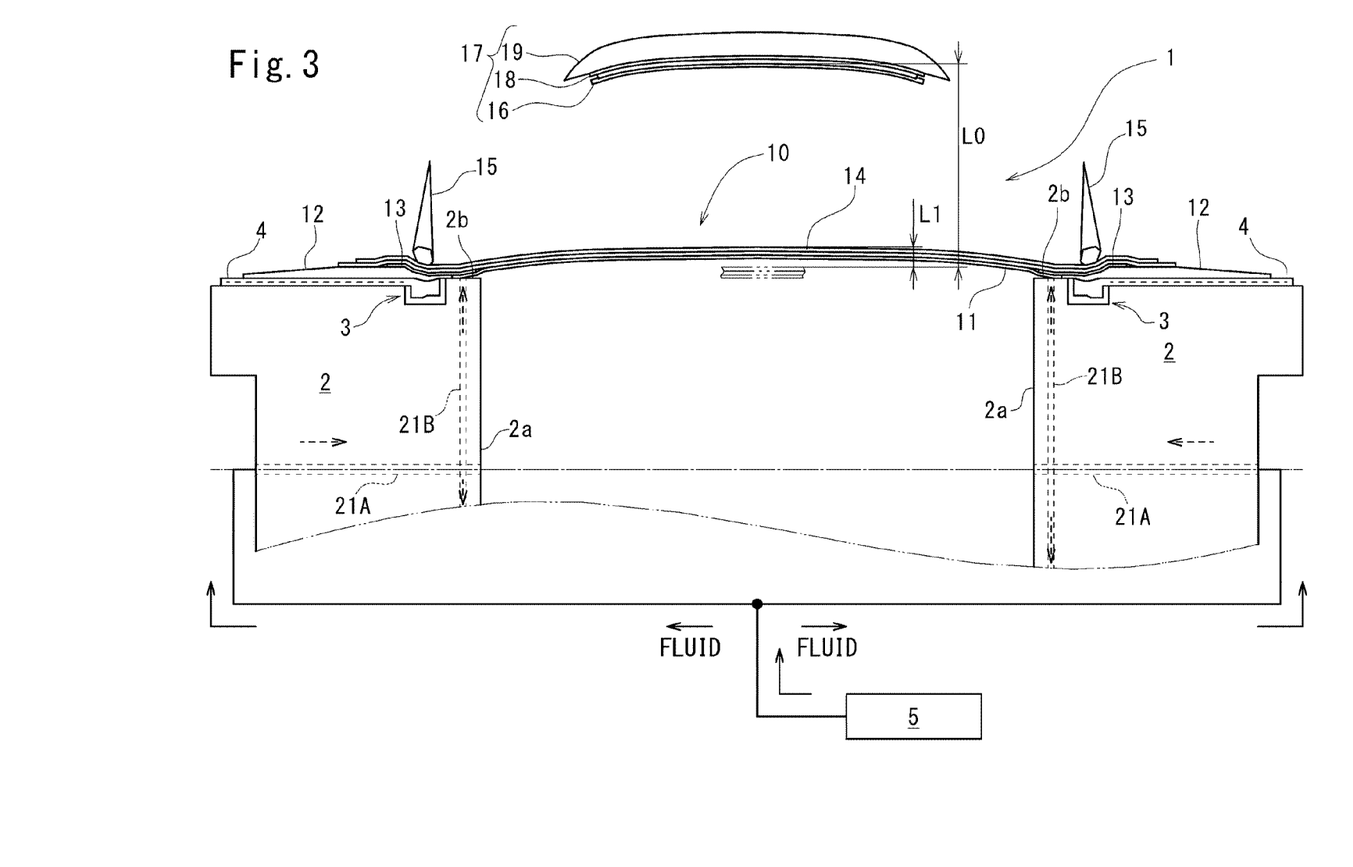
FIG. 3 is a view showing a state which is brought about by applying pre-shaping to the green case shown in FIG. 1.

As shown in FIG. 3, at a point of time when the pre-shaping step is finished, the green case 10 is expanded until the expansion amount of the green case 10 becomes the expansion amount L1 and is brought into a state where the green case 10 is lifted off from the outer peripheral portions 2b of the shaping drums 2 in a radially outward direction. That is, in the pre-shaping step, the shaping of the green case 10 is performed such that the green case 10 is expanded until the expansion amount of the green case 10 becomes the expansion amount L1 at the expansion rate V1.

Next, in the first shaping step, while continuously rotating the shaping drums 2, 2 and also continuously driving the shaping drums 2, 2 such that the shaping drums 2, 2 approach each other, the fluid supply part 5 changes the supply pressure P1 of the fluid to the first shaping pressure P12 from the pre-shaping pressure P11 in accordance with the predetermined pressure profile. The first shaping pressure P12 is set to a pressure necessary for expanding the green case 10 until the expansion amount of the green case 10 becomes an expansion amount L2 which is approximately 35% to 40% of the full expansion amount L0 from the expansion amount L1 at an expansion rate V2 (former stage expansion rate).

The expansion rate V2 is set to a speed slower than the expansion rate V1, for example, a speed approximately 0.5 times as large as the expansion rate V1. That is, the expansion rate V2 is set to a speed which falls within a range from 0.5 to 7 (%/sec). In this embodiment, the first shaping pressure P12 is set so that the expansion rate V2 becomes 5 (%/sec), for example. That is, in the first shaping step, the green case 10 can be more gently expanded into a toroidal shape in a more radially outward direction. As a result, the green case 10 can be expanded more uniformly.

The first shaping pressure P12 differs from the pre-shaping pressure P11. To be more specific, the first shaping pressure P12 is reduced to a pressure which is approximately 30% to 40% of the pre-shaping pressure P11. The first shaping pressure P12 is also set higher than a case internal pressure P21 at a point of time when the pre-shaping step is finished.

Figure 4:
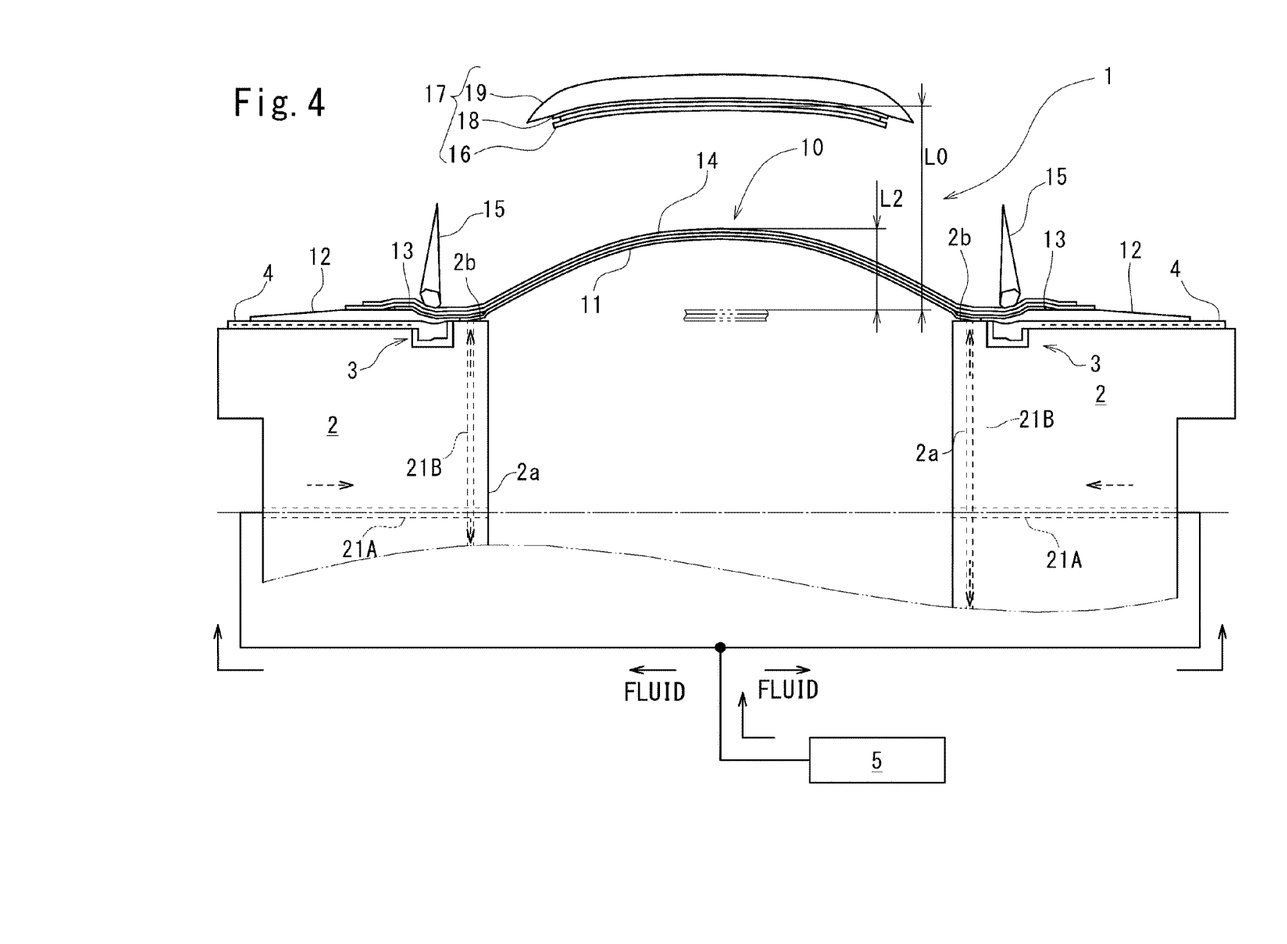
FIG. 4 is a view showing a state which is brought about by applying first shaping to the green case shown in FIG. 3.

As shown in FIG. 4, at a point of time when the first shaping step is finished, the green case 10 is expanded until the expansion amount of the green case 10 becomes the expansion amount L2. That is, in the first shaping step, the shaping of the green case 10 is performed such that the green case 10 is expanded until the expansion amount of the green case 10 becomes the expansion amount L2 from the expansion amount L1 at the expansion rate V2.

Next, in the second shaping step, while continuously rotating the shaping drums 2, 2 and also continuously driving the shaping drums 2, 2 such that the shaping drums 2, 2 approach each other, the fluid supply part 5 changes the supply pressure P1 to the second shaping pressure P13 from the first shaping pressure P12 in accordance with the pre-determined pressure profile. The second shaping pressure P13 is set to a pressure necessary for expanding the green case 10 to the inner diameter of the tread ring 17 from the expansion amount L2 at an expansion rate V3 (final stage expansion rate).

The expansion rate V3 is set to a speed faster than the expansion rate V2, for example, a speed approximately 1.5 times as large as the expansion rate V2. That is, the expansion rate V3 is a speed which falls within a range from 0.7 to 10 (%/sec), for example. In this embodiment, the second shaping pressure P13 is set such that the expansion rate V3 becomes 7.5 (%/sec), for example. At this stage of operation, in the first shaping step, the green case 10 is gently and uniformly expanded by an approximately former half of the full expansion amount L0, that is, by the expansion amount L2. Accordingly, even when the expansion rate is increased to the expansion rate V3 from the expansion rate V2 in the second shaping step which succeeds the first shaping step, the green case 10 can be further easily expanded while maintaining the uniformity. Further, by increasing the expansion rate in the second shaping step, it is possible to suppress the prolongation of a cycle time of the shaping step where the shaping is performed at the expansion rate V1 in the first shaping step which is a relatively low speed.

The second shaping pressure P13 differs from both the pre-shaping pressure P11 and the first shaping pressure P12. To be more specific, the second shaping pressure P13 is set to a pressure approximately 60% to 70% of the pre-shaping pressure P11, and is higher than the first shaping pressure P12. The second shaping pressure P13 is also set higher than a case internal pressure P22 at a point of time when the first shaping step is finished.

Figure 5:
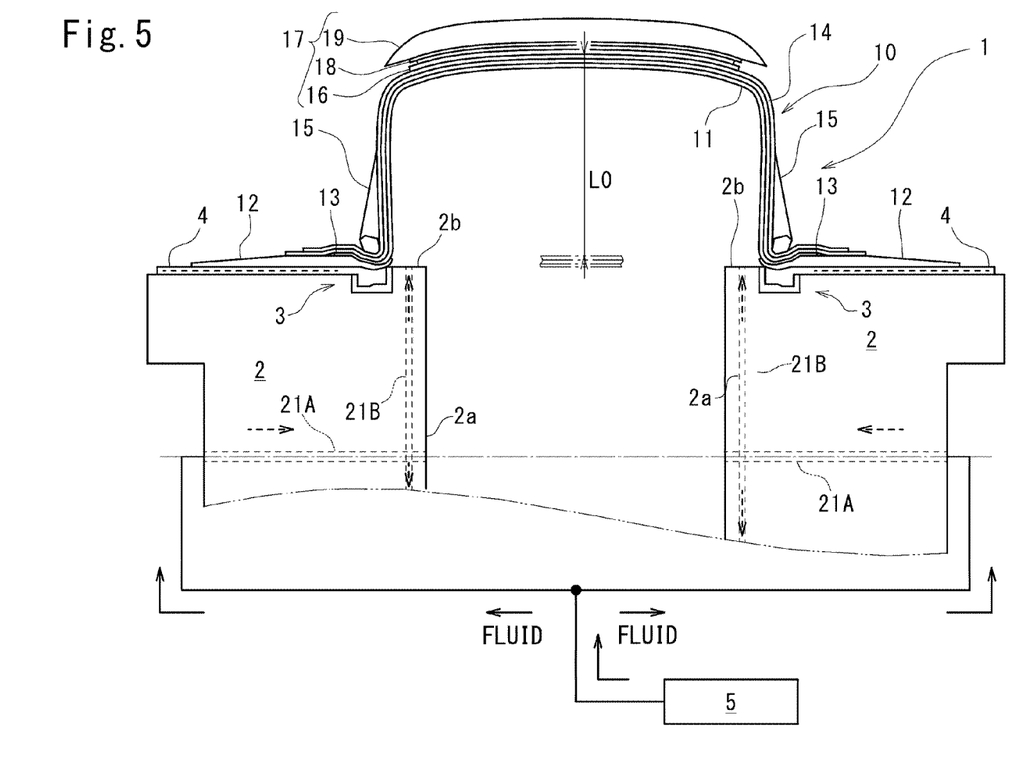
FIG. 5 is a view showing a state which is brought about by applying second shaping to the green case shown in FIG. 4.

By supplying the fluid into the green case 10 at the second shaping pressure P13 which is set higher than the first shaping pressure P12 and is set higher than the case internal pressure P22 at a point of time when the first shaping step is finished, as shown in FIG. 5, the green case 10 is further expanded into a toroidal shape in a radially outward direction, and is joined to an inner peripheral portion of the tread ring 17. That is, in the second shaping step, the shaping of the green case 10 is performed such that the green case 10 is expanded until the green case 10 is joined to the tread ring 17 from the expansion amount L2 at the expansion rate V3.

Figure 6:
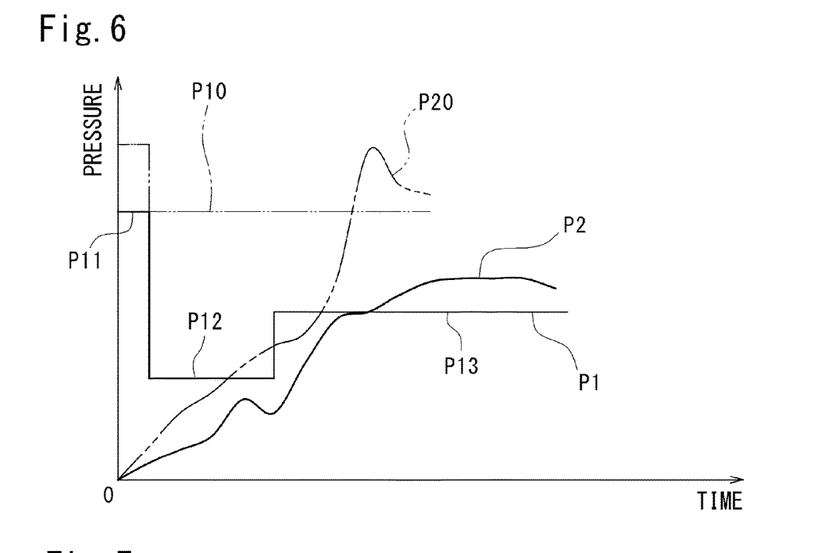
FIG. 6 is a graph showing a pressure profile during shaping.

That is, as shown in FIG. 6, by changing the supply pressure P1 of the fluid supplied into the green case 10 from the fluid supply part 5 in accordance with the pressure profile where the supply pressure P1 of the fluid is stepwisely changed to the pre-shaping pressure P11, the first shaping pressure P12, and the second shaping pressure P13 in that order so that the expansion rate V2 in the first shaping step becomes slower than the expansion rate V3 in the second shaping step, the case internal pressure P2 in the green case 10 can be gently increased without causing an overshoot.

To the contrary, as indicated by a double-dashed chain line in FIG. 6, when the supply pressure P10 of the fluid supplied into the green case 10 is set to a pressure higher than the second shaping pressure P13 without stepwisely changing the supply pressure P10, the case internal pressure P20 is suddenly increased thus easily causing an overshoot. Further, due to such an overshoot, it is difficult to uniformly expand the green case 10 so that the irregularities in expansion of the green case 10 are likely to increase. As a result, the irregularities in openings between the carcass cords are increased in the shaping steps.

According to the above-mentioned embodiment, the following advantageous effects can be acquired.

Until the expansion amount of the green case 10 becomes 35% to 40% of the full expansion amount of the green case 10 which allows the green case 10 to expand to an inner diameter of the tread ring 17, the expansion rate V2 in the first shaping step is slower than the expansion rate V3 in the second shaping step and hence, the carcass ply 14 can be easily and uniformly expanded by gently expanding the green case 10. Accordingly, even when the expansion rate is increased to the expansion rate V3 from the expansion rate V2 in the second shaping step which succeeds the first shaping step, the carcass ply 14 can be easily expanded while keeping the uniformity.

In this manner, it is possible to shape the green tire where the irregularities in the openings between the carcass cords in the carcass ply 14 are suppressed. Accordingly, in a pneumatic tire manufactured by subjecting such a green tire to vulcanization molding, unevenness of the tire caused by the irregularities in cord openings between the carcass cords can be suppressed and hence, as a result, the uniformity of the tire can be enhanced.

By setting the pre-shaping pressure P11 such that the pre-shaping pressure P11 differs from both the first shaping pressure P12 and the second shaping pressure P13, the degree of freedom in setting a pressure profile can be enhanced.

Further, the fluid supply part 5 supplies the fluid into the green case 10 at a relatively high pre-shaping pressure P11 in the pre-shaping step and hence, the case internal pressure P2 in the green case 10 can be rapidly increased. Since the green case 10 is expanded until the expansion amount of the green case 10 becomes L1 in the pre-shaping step and hence, expanding of the green case 10 has not yet progressed. Accordingly, even when the expansion rate V1 during this period is increased, cord openings between the carcass cords in the carcass ply 14 are minimally influenced.

Second Embodiment

Figure 7:
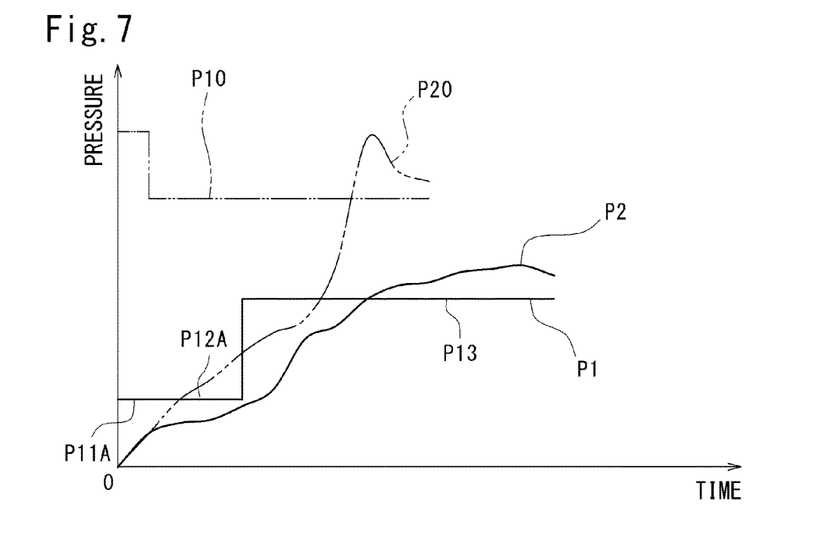
FIG. 7 is a graph showing a modification of the pressure profile.

A second embodiment differs from the first embodiment only with respect to a pressure profile of a supply pressure P1, and other configurations in the second embodiment are equal to the corresponding configurations in the first embodiment. In the second embodiment, a pressure profile is set such that a pre-shaping pressure P11A is equal to a first shaping pressure P12A. To be more specific, as shown in FIG. 7, the pre-shaping pressure P11A and the first shaping pressure P12A are equal. To be more specific, the pre-shaping pressure P11A and the first shaping pressure P12A are set to a pressure slightly lower than the first shaping pressure P12 according to the first embodiment.

By setting the pre-shaping pressure P11A and the first shaping pressure P12A equal, an expansion rate VIA in the pre-shaping step is further decreased and, as a result, the green case 10 can be expanded more gently. Accordingly, irregularities in cord openings between the carcass cords in the carcass ply 14 can be further easily suppressed.

Figure 8:
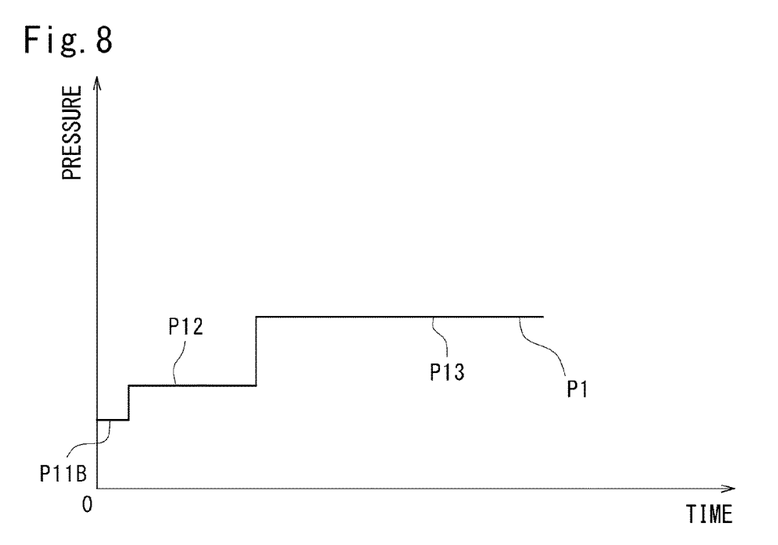
FIG. 8 is a graph showing a modification of the pressure profile.
Figure 9:
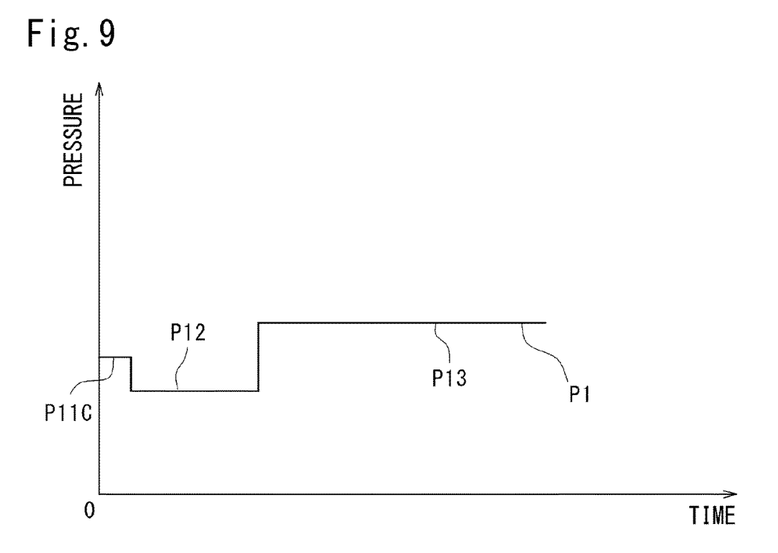
FIG. 9 is a graph showing a modification of the pressure profile.

Besides the above-mentioned respective embodiments, it may be possible to adopt a pressure profile where a pre-shaping pressure P11B is set lower than a first shaping pressure P12 as shown in FIG. 8, or a pressure profile where a pre-shaping pressure P11C is set higher than a first shaping pressure P12 and lower than a second shaping pressure P13 as shown in FIG. 9. Further, although the shaping step includes three steps in the above-mentioned respective embodiments, the shaping step may be divided into two steps or may be divided into four or more steps. In all these cases, it is sufficient that the first expansion rate V2 during the first shaping step is set to a relatively low and the second expansion rate V3 during the second shaping step is set to a relatively high.

It is sufficient to set a pressure profile such that the first shaping pressure P12 is a pressure necessary for expanding the green case 10 by an expansion amount L2, and the second shaping pressure P13 is a pressure necessary for joining the green case 10 to the tread ring 17.

In the above-mentioned respective embodiments, the description has been made by taking the case where the green case 10 is shaped by directly expanding the green case 10 from the inside by a pressure of a fluid as an example. However, the present invention is also applicable to a case where the green case 10 is shaped using a bladder. In such a case, it is sufficient that an inner pressure in the bladder is changed in accordance with the above-mentioned pressure profile.

First Reference Embodiment

Figure 10:
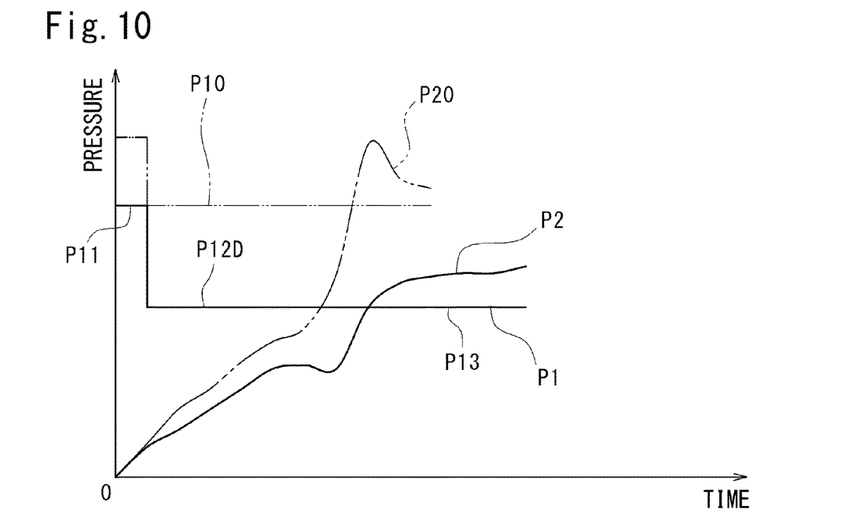
FIG. 10 is a graph showing a pressure profile according to a reference embodiment.

In a first reference embodiment, a pressure profile is set such that a first shaping pressure P12D and a second shaping pressure P13 are equal. In such a case, as shown in FIG. 10, a case internal pressure P2 in a green case 10 is gradually increased without causing an overshoot and hence, the green case 10 can be uniformly expanded. Accordingly, irregularities in cord openings between the carcass ply 14 can be easily suppressed.

Second Reference Embodiment

In a second reference embodiment, a pressure profile is set such that a first shaping pressure P12E and a second shaping pressure P13E become equal to a pre-shaping pressure P11. Further, a speed at which a pair of shaping drums 2, 2 approaches each other is set lower than a corresponding speed in the first embodiment. For example, the speed in this embodiment is set to ⅓ of the speed in the first embodiment.

Figure 11:
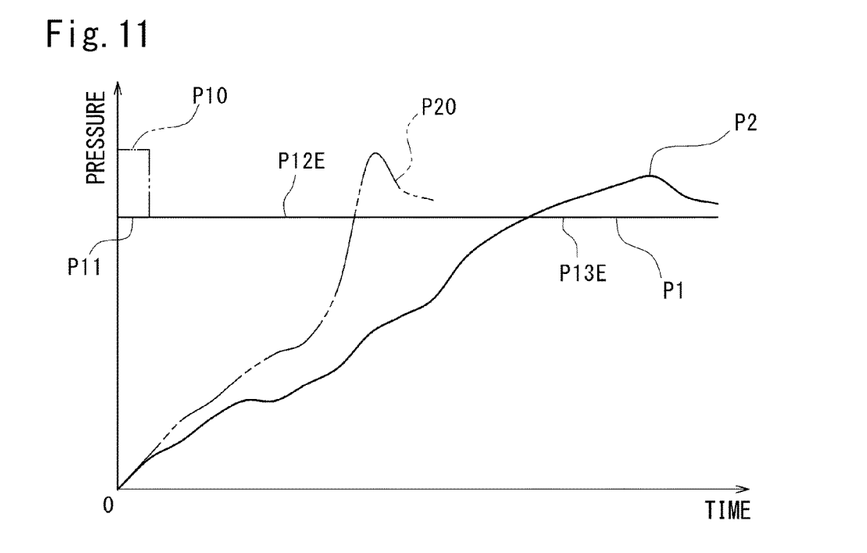
FIG. 11 is a graph showing a pressure profile according to another reference embodiment.

With such a configuration, as shown in FIG. 11, a case internal pressure P2 in the green case 10 is gradually increased without causing an overshoot. This is because a speed at which a volume in the green case 10 is decreased becomes gentle by lowering a speed at which the pair of shaping drums 2, 2 approaches and hence, even when the supply pressure P1 in the first and second shaping steps is increased, an overshoot minimally occurs. Also because of this reason, the green case 10 can be easily and uniformly expanded and hence, irregularities in cord openings between the carcass cords in the carcass ply 14 can be easily suppressed.

EXAMPLE

Next, verification tests were performed with respect to the operations and the advantageous effects described above. Sizes of tires were set equal. Pneumatic tires according to examples 1, 2 were prepared by subjecting green tires formed under shaping conditions according to the first and second embodiments to vulcanization molding. At the same time, pneumatic tires according to comparison examples 1 to 3 were prepared by subjecting a green tire formed under a conventional shaping condition and green tires formed under shaping conditions according to the first and second reference embodiments to vulcanization molding.

With respect to the respective pneumatic tires according to the examples 1, 2 and the comparison examples 1 to 3, dent amounts (recessed amounts with respect to tire surfaces) at buttress portions of the respective pneumatic tires which correspond to upper dies of tire vulcanizing mold dies were compared to each other, and comparison results are shown in Table 1. Assuming a dent amount of the pneumatic tire according to the comparison example 1 as 100, the dent amounts of the pneumatic tires according to the examples 1, 2 and the comparison examples 2, 3 are shown in Table 1 as relative values.

TABLE 1

|  | Comparison Example 1 | Comparison Example 2 | Comparison Example 3 | Example 1 | Example 2 |
| --- | --- | --- | --- | --- | --- |
| pre-shaping pressure (MPa) | 0.10 | 0.08 | 0.08 | 0.08 | 0.02 |
| first shaping pressure (MPa) | 0.08 | 0.05 | 0.08 | 0.03 | 0.02 |
| second shaping pressure (MPa) | 0.08 | 0.05 | 0.08 | 0.05 | 0.05 |
| speed at which a pair of shaping drum approches each other (mm/min) | 3000 | 3000 | 1000 | 3000 | 3000 |
| dent amounts of the pneumatic tire | 100 | 50 | 77 | 41 | 48 |

As shown in Table 1, in the pneumatic tires according to the examples 1, 2, the dent amounts were reduced to half or less of the dent amount of the pneumatic tire according to the comparison example 1. Further, in the pneumatic tires according to the comparison examples 2, 3, the dent amounts were larger than the dent amounts of the pneumatic tires according to the examples 1, 2. However, the dent amounts of the pneumatic tires according to the comparison examples 2, 3 were reduced to values lower than the dent amount of the pneumatic tire according to the comparison example 1.

Various modifications and variations are conceivable without departing from the spirit and scope of the present invention as described in the following claims.

What is claimed is:

1. A method of manufacturing a pneumatic tire including:
    forming a green case by cylindrically winding a tire component member which includes at least one layer of a carcass ply;
    shaping a green tire by expanding the green case into a toroidal shape with a supply of a fluid into the green case so that the green case adheres to a tread ring arranged radially outside the green case; and subsequently
    subjecting the green tire to vulcanization molding within a mold die, wherein
    during the shaping of the green tire, a former stage and a final stage following the former stage are performed in turn, and the fluid is supplied in accordance with a pressure profile which changes in a stepwise manner,
    during the former stage, the green case expands to 35% to 40% of a full expansion amount of the green case, the full expansion amount being an expansion of the green case to an inner diameter of the tread ring from a non-expanded state,
    during the final stage, the green case expands from the 35% to 40% of the full expansion amount to the inner diameter of the tread ring, and
    the pressure profile is set such that a former stage expansion rate in the former stage is set slower than a final stage expansion rate in the final stage.

2. The method of manufacturing a pneumatic tire according to claim 1, wherein the pressure profile is set such that an initial stage expansion rate when the green case is expanded until the expansion amount of the green case becomes 8% to 10% of the full expansion amount differs from both the former stage expansion rate and the final stage expansion rate.

3. The method of manufacturing a pneumatic tire according to claim 2, wherein the pressure profile is set such that the initial stage expansion rate is higher than both the former stage expansion rate and the final stage expansion rate.

4. The method of manufacturing a pneumatic tire according to claim 1, wherein the pressure profile is set such that an initial stage expansion rate when the green case is expanded until the expansion amount of the green case becomes 8% to 10% of the full expansion amount is equal to the former stage expansion rate.

\* \* \* \* \*